United States Patent
Flegel

(10) Patent No.: US 6,293,821 B1
(45) Date of Patent: *Sep. 25, 2001

(54) OPTIONAL PLUG CONNECTOR FOR A TRANSFER SWITCH HAVING A TERMINAL COMPARTMENT

(75) Inventor: David D. Flegel, Racine, WI (US)

(73) Assignee: Reliance Controls Corporation, Racine, WI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/062,257

(22) Filed: Apr. 17, 1998

(51) Int. Cl.[7] .................................................. H01R 13/60
(52) U.S. Cl. ......................................... 439/536; 439/535
(58) Field of Search ................................... 439/536, 535; 174/59, 60, 64, 65 R, 50, 58, 68.1, 72 A, 135, 53, 67; 361/643, 644, 657, 667, 641, 600, 661, 663; 307/64; 312/100; 220/242

(56) References Cited

U.S. PATENT DOCUMENTS

| Re. 34,113 | * | 10/1992 | Miller et al. | 361/663 |
|---|---|---|---|---|
| D. 400,183 | * | 10/1998 | Flegel | D13/164 |
| 2,577,974 | * | 12/1951 | McKinley | 439/535 |
| 2,603,546 | * | 7/1952 | Lais | 361/643 |
| 3,123,744 | * | 3/1964 | Fisher | 361/663 |
| 3,315,556 | * | 4/1967 | Speck | 361/644 |
| 3,353,068 | * | 11/1967 | Turk | 361/643 |
| 3,585,456 | * | 6/1971 | Philips, Jr. | 361/663 |
| 3,895,179 | * | 7/1975 | Wyatt | 174/50 |
| 4,390,926 | * | 6/1983 | Hart | 361/334 |
| 5,045,969 | * | 9/1991 | Menasco | 361/663 |
| 5,239,129 | * | 8/1993 | Ehrenfels | 174/51 |
| 5,301,086 | * | 4/1994 | Harris et al. | 361/641 |
| 5,648,646 | * | 7/1997 | Flegel | 200/50.32 |
| 5,761,027 | * | 6/1998 | Flegel | 361/664 |
| 5,784,249 | * | 7/1998 | Pouliot | 361/622 |
| 5,870,276 | * | 2/1999 | Leach et al. | 361/627 |
| 5,895,981 | * | 4/1999 | Flegel | 307/64 |
| 5,984,719 | * | 11/1999 | Flegel | 439/528 |
| 6,031,193 | * | 2/2000 | Flegel | 200/50.33 |

* cited by examiner

*Primary Examiner*—Gary Paumen
*Assistant Examiner*—Ross Gushi
(74) *Attorney, Agent, or Firm*—Boyle, Fredrickson, Newholm, Stein & Gratz, S.C.

(57) ABSTRACT

A power transfer device adapted for interconnection with the electrical system of a building includes a cabinet, a set of switches mounted to the cabinet, and a first set of wires for connecting the switches to an electrical distribution panel associated with the building electrical system. The power transfer device includes a terminal compartment associated with the cabinet, a set of power input terminals located within the terminal compartment, and a cover removably connected to the cabinet for alternatively preventing and permitting access to the terminal compartment. The cover is provided with a coupling arrangement adapted to be interconnected with the power input terminals, for selectively receiving an input member on one end of a flexible cord in electrical communication with a source of auxiliary power.

17 Claims, 4 Drawing Sheets

OPTIONAL PLUG CONNECTOR FOR A TRANSFER SWITCH HAVING A TERMINAL COMPARTMENT

BACKGROUND AND SUMMARY OF THE INVENTION

This invention relates to a power inlet arrangement for providing power to the electric system of a building, such as power supplied from a standby generator.

Portable generators may be used in certain situations to feed electrical power to residential and commercial load circuits during a utility power outage. These systems frequently include a power inlet box adapted for interconnection with the generator. The power inlet box is typically mounted to the exterior of a building. The power inlet box is connected to a transfer switching mechanism which continues the electrical path through circuit breakers associated with the transfer switching mechanism, to supply power to certain selected circuits of the load center as determined by the transfer switching mechanism circuit breakers. The circuits of the transfer switching mechanism are wired to selected circuits of the load center, through wiring housed within a conduit extending between the load center and the transfer switching mechanism.

The present invention relates to a power transfer arrangement such as is disclosed in U.S. Pat. No. 5,895,981, issued Apr. 20. 1999, the disclosure of which is hereby incorporated by reference. In the '981 patent, a power transfer switching mechanism for interposition between a remote power inlet box and the electrical load center of a building includes a terminal compartment for receiving power input wires connected to the remote power inlet box. The switching mechanism includes a cabinet defining an internal cavity within which a series of switches are mounted. The cabinet further defines a terminal compartment, and a terminal assembly is disposed within the terminal compartment. The terminal compartment is accessible through an opening associated with the cabinet, and a cover is selectively positionable over the opening to provide or prevent access to the terminal compartment. A series of wires are interconnected between the terminal assembly and the switches, and power input wiring is received within the terminal compartment and interconnected with the remote power inlet box. The ends of the power input wires are engageable with the terminal assembly for establishing a direct electrical connection between the remote power inlet box and the switches of the switching mechanism.

While the above-described power transfer switching mechanism provides an extremely convenient and simple arrangement for establishing a direct, hardwired connection with the power inlet box, it is sometimes desirable to provide a power transfer switching mechanism having a power input receptacle in its front panel. With this modification, the generator power cord may be plugged into the power input receptacle. Alternatively, the remote power inlet box may be wired to a power cord connected to a junction box, and the power cord may be selectively engageable with the power input receptacle of the power transfer switching mechanism. Although the broad concept of providing power input receptacles on a power transfer switching mechanism is well known, it is desirable to modify the power transfer switching mechanism described in the aforementioned copending patent application, to provide a selective rather than a hardwired connection with the power inlet box.

It is an object of the present invention to provide a transfer switching mechanism having a removable access cover provided with a power input receptacle for providing input power to the transfer switching mechanism from a generator or from a power inlet connected with the generator. It is a further object of the present invention to provide such a transfer switching mechanism which ensures that a reliable selective connection is established with the generator when power is supplied to a transfer switching mechanism. Another object of the present invention is to provide a transfer switching mechanism which is simple to install and which operates generally similarly to prior art transfer switching mechanisms.

The invention contemplates an improvement in a power transfer arrangement for supplying power from a generator to the electrical system of a building. The power transfer arrangement includes a power inlet arrangement for interconnection with the generator for receiving power therefrom, and a power transfer device separate from the power inlet arrangement adapted for interconnection with the building electrical system. The invention resides in a power input terminal arrangement in the power transfer device in combination with a removable cover associated with the power transfer device for preventing access to the power input terminal arrangement. The cover is provided with a power input receptacle connected to the power input terminal arrangement for selectively receiving a plug connector in electrical communication with the power inlet arrangement. The power transfer device includes a cabinet having a front panel to which is mounted a set of switches for controlling the supply of power from the power transfer device to the building electrical system, and set of switches are electrically connected to the power input terminal arrangement. The power transfer device further includes a set of power input terminals for establishing a direct electrical connection between the power inlet arrangement and the power transfer device. The power input terminals are located within a power input terminal compartment defined by the cabinet at a location spaced from the set of switches. The cabinet defines an opening, providing access to the power input terminal compartment. The cover is positionable over the opening, and removably engageable with the cabinet for selectively closing, the opening, for preventing access to the power input terminal compartment. The opening, providing access to the power input terminal compartment is defined in part by a rearwardly extending edge of the front panel. The cover has a rearwardly extending ledge engageable with the rearwardly extending edge of the front panel, and a vertically extending wall depending from the ledge and engageable with an end wall of the cabinet. The ledge is recessed to accommodate the power input terminals when the cover is in position covering the opening. The power input receptacle extends through and is fixed to the vertically extending wall of the cover. The power input receptacle includes a cylindrical body and a circular collar adapted to overlie the vertically extending wall of the cover. The power transfer device also includes a set of power input wires extending between the power input receptacle and the power input terminals.

The invention further contemplates an improvement in a power transfer device adapted for interconnection with the electrical system of a building and including a cabinet, a set of switches mounted to the cabinet, and a first set of wires for connecting the switches to an electrical distribution panel associated with the building electrical system. The invention is in the form of a terminal compartment associated with the cabinet, a set of power input terminals located within the terminal compartment, and a cover removably connected to the cabinet for alternately preventing and permitting access to the terminal compartment. The cover is provided with a coupling arrangement interconnected with the power input terminals and adapted to selectively receive an input member on one end of a flexible cord in electrical communication with a source of auxiliary power. A set of power input wires enables interconnection of the coupling arrangement with the power input terminals. The power input terminals are connected to the switches by a second set of wires. The cabinet includes a set of tabs spaced along an end wall thereof, the tabs having apertures formed therein. The cover includes a set of openings alignable with the apertures in the tabs. A set of fasteners is passed through the openings in the cover and is threadably engageable with the apertures in the tabs. One of the fasteners is used to secure the coupling arrangement to the cover.

The invention also relates to a method for constructing a power transfer device for supplying power to the electrical system of a building from a generator in electrical communication with a separate power inlet arrangement. The method includes the steps of providing a cabinet having a power terminal arrangement; equipping the cabinet with a front panel including a plurality of switches electrically connected to the power input terminal arrangement for controlling the supply of power from the power transfer device to the building electrical system; and supplying the cabinet with a cover removably connected thereto for alternately preventing and permitting access to the power input terminal arrangement. The cover is provided with a power input receptacle connected to the power input terminal arrangement for selectively receiving a plug connector in electrical communication with the power inlet arrangement.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings.

DETAILED DESCRIPTION OF THE INVENTION

Figure 1:
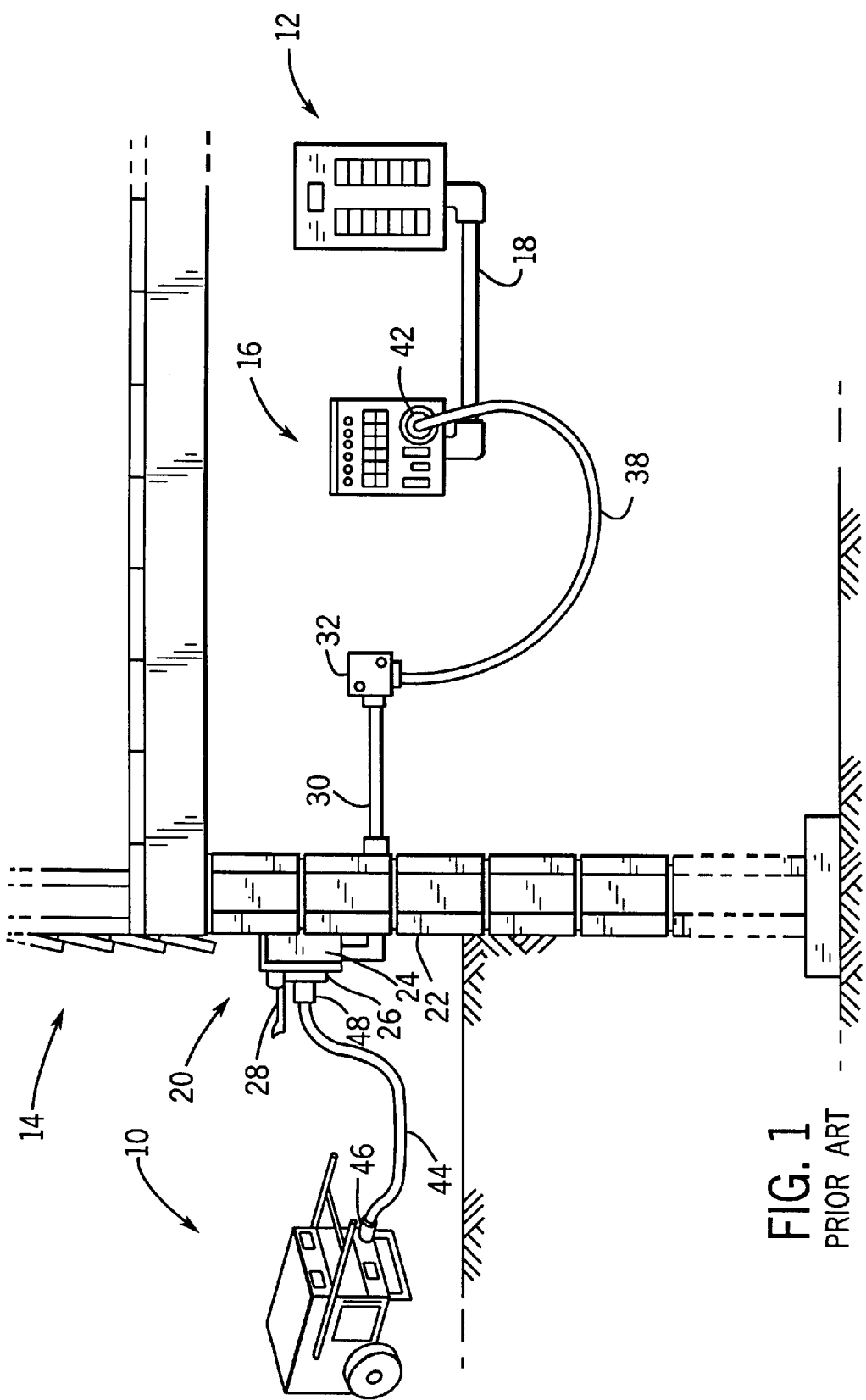
FIG. 1 is a schematic representation showing a prior art power inlet arrangement for interconnecting a portable power generator with an electrical panel associated with a building.

FIG. 1 shows a prior art power inlet arrangement for interconnecting a portable generator 10 with a main electrical panel or load center 12 located in the interior of a building 14. In the prior art power inlet arrangement of FIG. 1, a manual power transfer panel 16 is mounted adjacent main panel 12, and is interconnected therewith via a series of wires enclosed by a conduit 18 extending between main panel 12 and transfer panel 16. Transfer panel 16 may illustratively be a panel such as that manufactured by Reliance Time Controls, Inc. of Racine, Wis. under the designation GEN/TRAN (e.g. Model 20216 or any other satisfactory model).

A power inlet box 20 is mounted to the wall of building 14, shown at 22. Power inlet box 20 includes an external housing including a series of walls such as 24, and a recessed power inlet 26 mounted to a front wall of the housing. A cover 28 is mounted to the front wall of the housing via a hinge structure, and is movable between an open position as shown in FIG. 1 and a closed position in which cover 28 encloses recessed power inlet 26 when not in use. A conduit 30 extends between inlet box 20 and a junction box 32, and a flexible cord 38 is attached at one end to junction box 32. At its opposite end, flexible cord 38 has a connector 42 engageable with a power inlet receptacle provided on transfer panel 16. Appropriate wiring and connections are contained within inlet box 20, conduit 30 and junction box 32 for providing an electrical path between inlet box 20 and transfer panel 16 when cord 38 is engaged with the inlet receptacle of transfer panel 16.

A power cord 44 extends between generator 10 and power inlet box 20. Cord 44 includes a plug 46 at one end, which is engageable with the power outlet of generator 10. Cord 44 further includes a connector 48 at the end opposite plug 46. Connector 48 is engageable with recessed power inlet 26 for transferring power generated by generator 10 to power inlet box 20, which is then supplied through the wiring in conduit 30, junction box 32, cord 38 and connector 42 to transfer panel 16, and from transfer panel 16 through the wiring in conduit 18 to main panel 12. In this manner, generator 10 functions to provide power to selected circuits of main panel 12 during a power outage. In this arrangement, it is necessary for the user to first connect cord 38 to the power input of transfer panel 16 utilizing connector 42, and to then exit the building, connect cord 44 between generator 10 and power inlet 20, and then commence operation of generator 10. This two-step procedure inevitably consumes a certain amount of time and inconvenience by first having to engage cord 38 with transfer panel 16 within building 14 and then exiting the building to carry out the various operations associated with connection and startup of generator 10.

Transfer panel 16 includes a socket for receiving connector 42, which is wired to a series of switches on transfer panel 16, in a manner as is known. The switches of panel 16 control the supply of power to load center 12 when power is supplied from generator 10 to transfer panel 16 by engagement of connector 42 with the socket of transfer panel 16. In the construction of transfer panel 16, the socket is wired directly to the switches within the interior of transfer panel 16, in a manner as is known.

Figure 2:
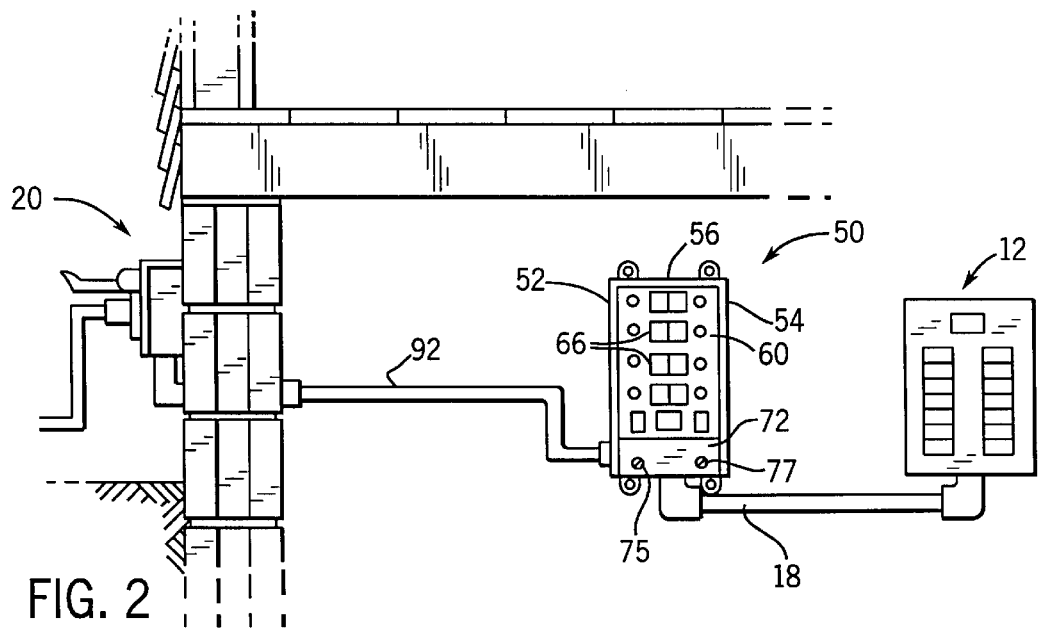
FIG. 2 is a schematic representation similar to FIG. 1, showing the power transfer arrangement constructed according to the invention, for interposition between a remote power inlet and the electrical panel.

FIG. 2 illustrates a power transfer arrangement in accordance with the invention for providing power from generator 10 to main electrical panel 12. In the power transfer arrangement of FIG. 2, power inlet box 20 and main electrical panel 12 have the same function and construction as in the prior art power transfer arrangement of FIG. 1.

Figure 3:
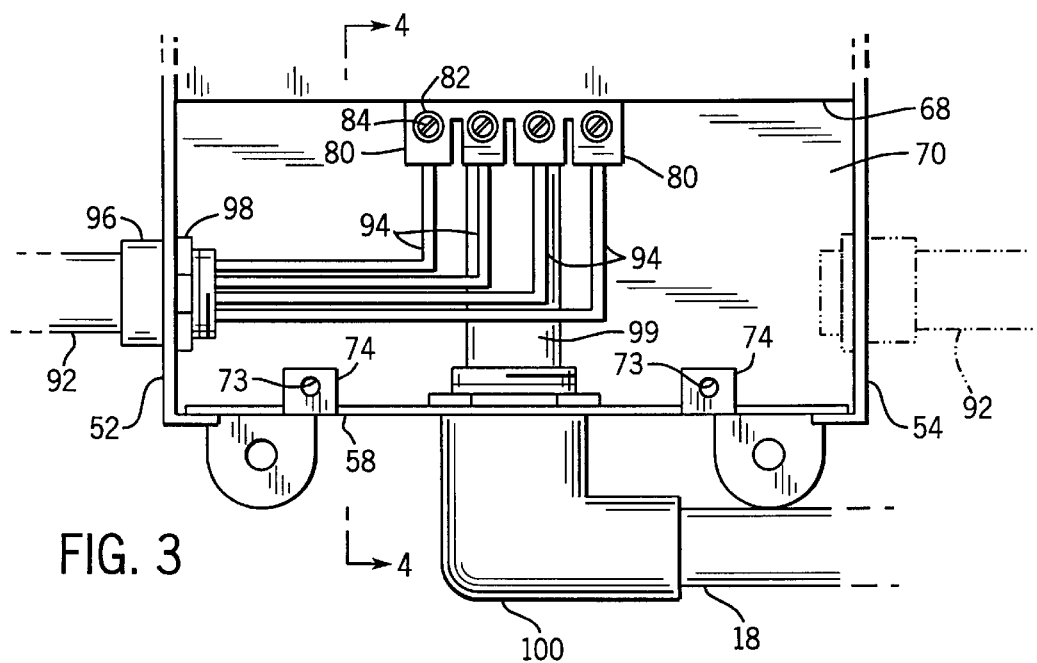
FIG. 3 is a partial front elevation view showing the bottom portion of the power transfer arrangement of FIG. 2 with the access cover removed.
Figure 4:
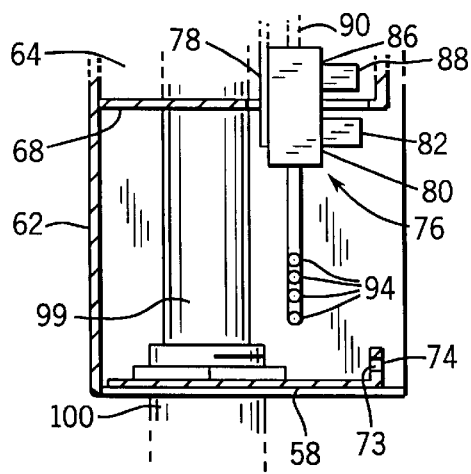
FIG. 4 is a partial section view taken along line 4—4 of FIG. 3.
Figure 7:
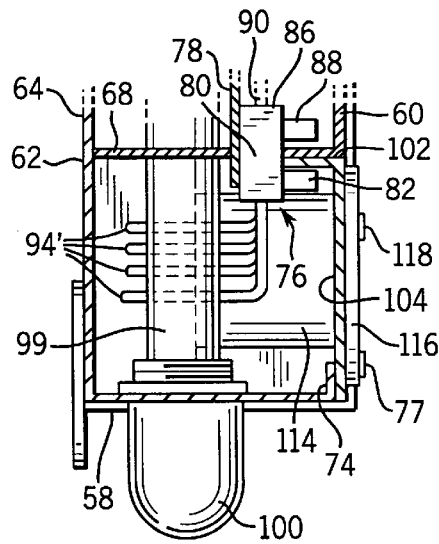
FIG. 7 is a partial sectional view taken on line 7—7 of FIG. 5.
Figure 5:
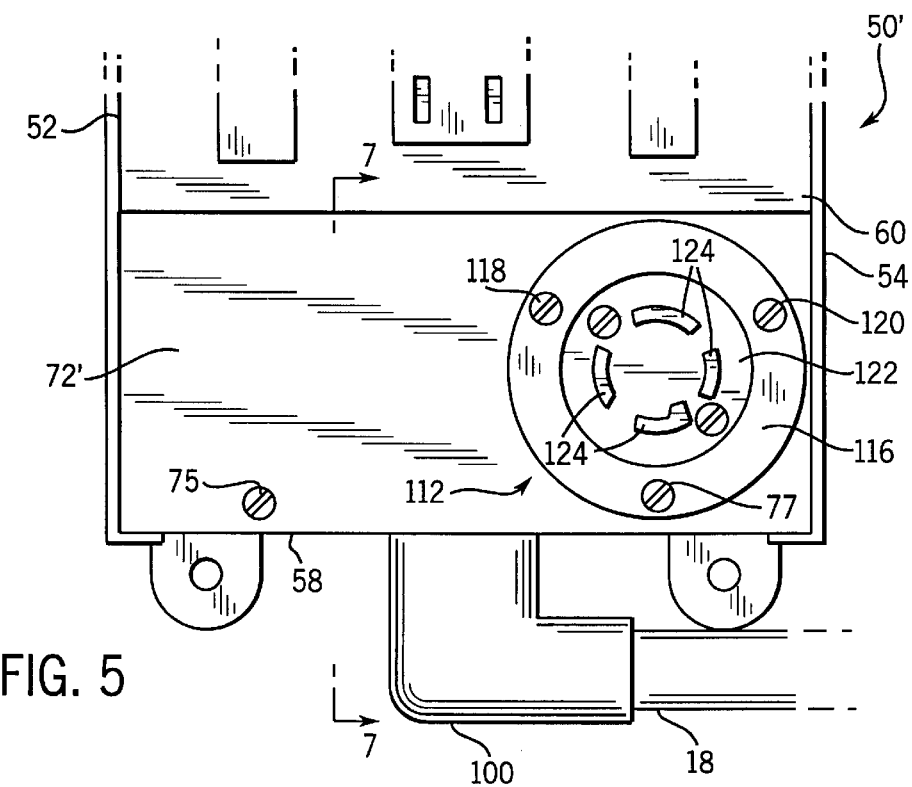
FIG. 5 is a partial front elevational view showing the bottom portion of an alternative power transfer arrangement in which the access cover is provided with an optional plug connector and is shown in an installed condition.

In the power transfer arrangement of FIG. 2, a power transfer switching mechanism 50 is interposed between load center 12 and inlet box 20. Power transfer switching mechanism 50 includes a cabinet defining a pair of side walls 52, 54, a top wall 56 extending between the upper ends of side walls 52 and 54, a bottom wall 58 (FIG. 3) extending between and interconnecting the lower ends of side walls 52 and 54, a partial height front panel 60 and a rear panel 62 (FIG. 4). Walls 52–58, in combination with front panel 60 and rear panel 62, define an upper cavity 64 within which a series of circuit breakers or switches 66 are located.

Front panel 60 is bent rearwardly at its lower end to form an intermediate transverse wall 68 which defines the lower extent of upper cavity 64. A terminal compartment 70 is defined by intermediate transverse wall 68 in combination with bottom wall 58, the lower portions of side walls 52 and 54, and the lower portion of rear panel 62. Terminal compartment 70 is accessible through an opening below front panel 60. A cover 72 (FIG. 2) is sized so as to enclose the opening of terminal compartment 70. Cover 72 includes a pair of openings in alignment with openings 73 formed in a pair of tabs 74 mounted to bottom wall 58, to enable cover 72 to be mounted to bottom wall 58 utilizing threaded fasteners 75, 77 (FIG. 2) which extend through the openings in cover 72 and into engagement with the openings 73 in tabs 74. In this manner, cover 72 is selectively engaged with bottom wall 58 to provide access to terminal compartment 70, and is connected to bottom wall 58 so as to prevent access to terminal compartment 70.

A terminal assembly 76 is mounted to a vertical plate 78, which is mounted at its ends to intermediate transverse wall 68 to fix terminal assembly 76 in position relative to intermediate transverse wall 68. Terminal assembly 76 is of conventional construction, including a series of cylindrical receivers 80, each of which defines a downwardly facing opening. Each receiver 80 includes an outwardly extending cylindrical member 82 extending perpendicularly to receiver 80, defining a passage for receiving a threaded member, the head of which is shown at 84 (FIG. 3). Receivers 80 are accessible from, and in communication with, terminal compartment 70. Terminal assembly 76 further includes a series of upwardly opening cylindrical receivers 86, which are disposed within upper cavity 64. Each upper cylindrical receiver 86 includes a cylindrical member 88 which receives a threaded member (not shown).

Terminal assembly 76 may illustratively be a terminal assembly such as is available from Atech Corp. of Somerville, N.J., under its Model No. TSF/16, although it is understood that any other satisfactory terminal arrangement could be employed. In a terminal arrangement such as this, receivers 80 and 86 are formed of a molded plastic material integrally with cylindrical members 82 and 88. These components surround metal contact assemblies, with one of the contact assemblies being located in both a cylindrical receiver 80 and a cylindrical receiver 86. In this manner, an electrical connection to terminal assembly 76 is made by inserting a bare wire end into the open lower end of receiver 80 and tightening the threaded member utilizing its head 84, to establish an electrical connection with the wire via the metal contact enclosed within cylindrical receiver 80. A similar operation is employed to connect a wire end to the contact enclosed by the opposed cylindrical receiver 86, so as to establish a connection between the wires connected to the terminal assembly in this manner.

As shown in FIG. 4, a wire such as 90 is connected to each upper cylindrical receiver 86 at one end. Two of wires 90 feed bus bars (not shown), which in turn are interconnected with switches 66 to provide power to switches 66. A third one of wires 90 is a neutral wire which is connected to the neutral of load center 12, and a fourth one of wires 90 is a ground wire attached to the frame of transfer switching mechanism 50.

Referring to FIGS. 2 and 3, a conduit 92 extends between power inlet box 20 and switching mechanism 50. Conduit 92 encloses a series of power input wires 94 (FIG. 3), and extends through a knock-out opening formed in the lower portion of side wall 52 via a conventional nipple 96 and lock nut 98. As can be appreciated, an input wire conduit such as 92 could also be connected through a knock-out opening in side wall 54, as shown in phantom in FIG. 3, or in knock-out openings in bottom wall 58 or the lower portion of rear panel 62.

The ends of power input wires 94 are connected to terminal assembly 76 by placing the bare end of each wire 94 into one of receivers 80 and tightening the associated threaded member, as explained previously, to establish an electrical connection with a contact member enclosed by one of the cylindrical receivers 80. In this manner, input power is supplied from remote power inlet 20 to terminal assembly 76, which is subsequently transferred from terminal assembly 76 to wires 90 and thereby to switches 66, as explained previously. This arrangement enables a person installing switching mechanism 50, such as an electrician or do-it-yourself homeowner, to establish a direct electrical connection between remote power inlet box 20 and switching mechanism 50, without the need for connecting a flexible cord to a power input receptacle as in the prior art. In this manner, after generator power cord 44 is plugged into remote power inlet box 20, the only necessary operation in connection with switching mechanism 50 to enable transfer of power from generator 10 to load center 12 is to place switches 66 in the appropriate position so as to transfer power to load center 12 as desired in response to operation of generator 10.

Output wires from switches 66, shown at 99, extend through terminal compartment 70 to a conduit fitting 100 secured to bottom wall 58, for routing the wires through conduit 18 to load center 12. Other wires extend through terminal compartment 70, such as neutral and ground wires as well as input wires from load center 12.

It can thus be appreciated that the provision of terminal compartment 70 provides an extremely convenient and simple arrangement for establishing a direct, hardwired connection between power inlet box 20 and power transfer switching mechanism 50. The user or installer simply must remove cover 72 to gain access to terminal compartment 70 for connecting or disengaging power input wires 94 to or from terminal assembly 76. Terminal compartment 70 also provides a convenient cavity to facilitate pulling of wires through conduit 92. Once the user has completed the necessary operations in terminal compartment 70, the user simply replaces cover 72 as described previously, to thereby prevent access to terminal compartment 70.

Figure 6:
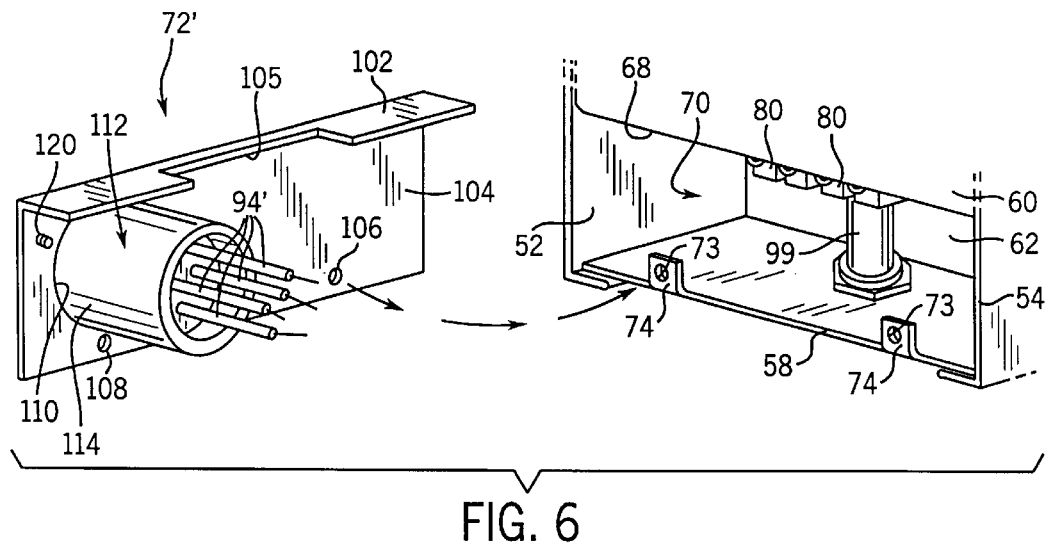
FIG. 6 is an exploded view of the access cover and the bottom portions of the alternative power transfer arrangement shown in FIG. 5.
Figure 8:
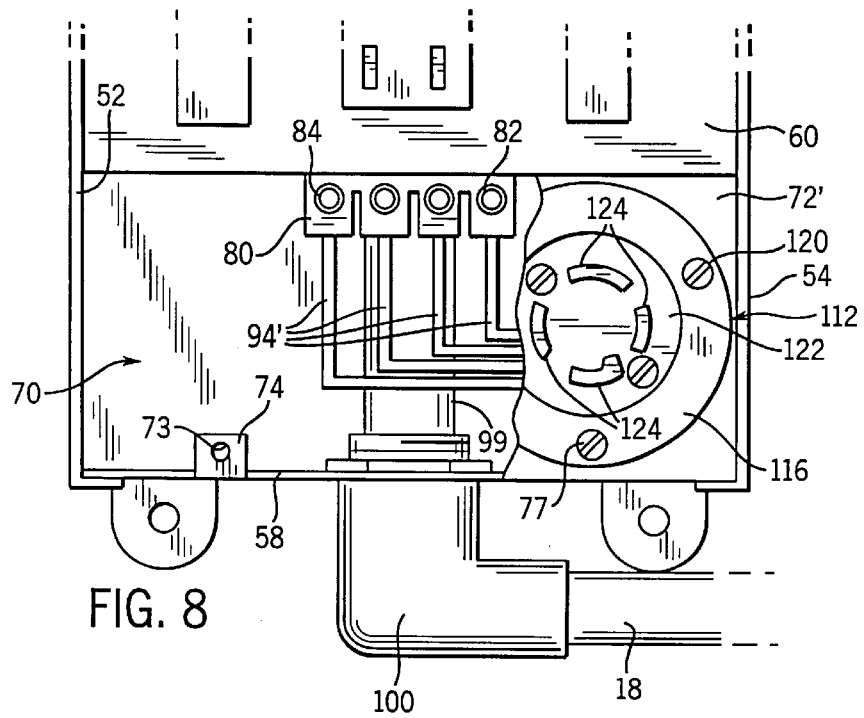
FIG. 8 is a view similar to FIG. 5 but showing part of the access cover broken away to view the components in the bottom portion of the alternative power transfer arrangement.

FIGS. 5–8 disclose an alternative embodiment of the power transfer arrangement 50' having substantially identical components as previously described in FIGS. 2–4 except for removable access cover 72' and power input wires 94'. In this power transfer arrangement 50', cover 72' has a rearwardly extending ledge 102 which is engageable beneath the transverse wall 68 of front panel 60, and a vertically extending wall 104 which depends downwardly from ledge 102 and is engageable against cabinet side walls 52, 54 and end wall 58. As seen in FIG. 6, ledge 102 includes a central recess 105 for accommodating the power input terminals 80, 82. It should be appreciated that cover 72 also includes ledge 102, vertical wall 104 and central recess 105.

Cover 72' further includes a pair of openings 106, 108 in alignment with openings 73 formed in the pair of tabs 74 projecting from bottom wall 58 to enable cover 72' to be secured to bottom wall 58 by threaded fasteners 75, 77 which extend through the cover openings 106, 108 and into threaded engagement with tab openings 73.

An opening 110 is formed in wall 104 adjacent one of its ends. A power input socket, shown generally at 112, is engaged with wall 104 at opening 110. Socket 112 is of conventional construction for receiving a plug connertor in a power transfer panel, and includes a cylindrical body 114 and a circular collar 116. Cylindrical body 114 extends through opening 110 such that circular collar 116 overlies and engages the front surface of wall 104. A pair of threaded fasteners 118, 120 extend through aligned openings in collar 116 and in wall 104 adjacent opening 110, to mount socket 112 to wall 104. In addition, an opening is formed in collar 116 in alignment with opening 108, and fastener 77 extends therethrough and into engagement with opening 73 in tab 74 adjacent socket 112 for securing socket 112 to wall 104.

Socket body 114 defines an outwardly open internal cavity which is closed at its inner end by an end wall 122. A series of male prongs 124 extend from end wall 122 into the internal cavity defined by socket body 114. Power input wires 94' are interconnected with prongs 124 and with power input terminals 80, for establishing an electrical connection between prongs 124 and switches 66.

In a manner as is known, prongs 124 are adapted for engagement with the female end of a plug connector. In an arrangement such as illustrated in FIG. 1, connector 42 or cord 38, which extends from junction box 32, may be engaged with prongs 124 for supplying power to power transfer arrangement 50' from generator 10. Alternatively, a power cord may extend directly from generator 10 through an opening in wall 22, such as a window, and a connector at the end of such a cord may be engageable with prongs 124 for supplying power directly to power transfer arrangement 50' from generator 10.

It can thus be appreciated that a manufacturer can provide either a hardwired power transfer switching mechanism 50 or a socket-type power transfer switching mechanism 50' simply by mounting either cover 72 or cover 72' to the cabinet over terminal compartment 70. This provides significant efficiencies in manufacturing by providing a large number of common components for two different models. In addition, it can be appreciated that the hardwired version of power transfer switching mechanism 50 can be retrofit to provide a socket-type switching mechanism 50' by replacing cover 72 with cover 72', or a socket-type power transfer switching mechanism 50' can be transformed into a hardwired power transfer mechanism 50 by replacing cover 72' with cover 72 in the field.

Various alternatives and embodiments are contemplated as being within the scope of the following claims particularly pointing out and distinctly claiming the subject matter regarded as the invention.

I claim:

1. An auxiliary power supply system for supplying power to the electrical system of a building, comprising:
    a generator for supplying auxiliary power;
    a flexible power supply member interconnected with the generator and including a plug-type connector; and
    a power transfer device electrically interconnected with the building electrical system, wherein the power transfer device comprising:
        a housing;
        one or more switches mounted to the housing, wherein a power input conductor extends from each switch;
        a connection compartment defined by the housing, wherein the conductors terminate in a power input connection arrangement within the connection compartment at a location spaced from the switches;
        a cover arrangement interconnected with the power transfer device housing, including a fixed first cover section and a removable second cover section selectively engageable with the power transfer device housing over the connection compartment, wherein the second cover section is configured to cover the connection compartment to prevent access to the power input connection arrangement, wherein the switches are mounted to the housing at a location spaced from the second cover section; and
        power input structure provided on the removable second cover section, wherein the power input structure is separate from the power input connection arrangement;
    wherein the plug-type connector is selectively engageable with the power input structure for establishing an electrical connection of the generator to the power transfer device through the power input structure and the power input connection arrangement, and wherein the supply of auxiliary power to the building electrical system is controlled through the switches.

2. The auxiliary power supply system of claim 1, wherein the switches are mounted to the fixed first cover section.

3. The auxiliary power supply system of claim 1, wherein the power input connection arrangement comprises a set of power input terminals located within the connection compartment, wherein the power input conductors are connected to the set of power input terminals.

4. The auxiliary power supply system of claim 3, wherein the power input structure is electrically interconnected with the set of power input terminals by means of a set of power input wires extending between the power input structure and the set of power input terminals.

5. The auxiliary power supply system of claim 3, wherein the connection compartment opens in a forward direction and wherein the first cover section includes a rearwardly extending edge adjacent the connection compartment.

6. The auxiliary power supply system of claim 5, wherein the second cover section has a rearwardly extending ledge engageable with the rearwardly extending edge of the first cover section, and a vertically extending wall depending from the ledge and engageable with an end wall defined by the first cover section.

7. The auxiliary power supply system of claim 6, wherein the ledge is recessed to accommodate the set of power input terminals when the second cover section is engaged with the first cover section to cover the connection compartment.

8. The auxiliary power supply system of claim 6, wherein the power input structure extends through and is fixed to the vertically extending wall of the second cover section.

9. The auxiliary power supply system of claim 6, wherein the power input structure includes a cylindrical body and a circular collar adapted to overlie the vertically extending wall of the second cover section.

10. An auxiliary power supply system for interconnection with the electrical system of a building, comprising:
    a generator for supplying electrical power;
    a flexible cord interconnected with the generator, wherein the flexible cord has an input member; and
    a power transfer device including: a cabinet; a set of switches mounted to the cabinet; a first set of wires interconnected between the switches and an electrical distribution panel associated with the building electrical system; a fixed position panel forming a part of the cabinet; a terminal compartment defined by the cabinet, wherein the terminal compartment is spaced from the switches and is accessible through an opening defined by the fixed position panel; a set of power input terminals located within the terminal compartment; a removable cover selectively engageable with the cabinet, wherein the removable cover is configured to close the opening when engaged with the cabinet for selectively preventing and providing access to the terminal compartment; and a power input coupling arrangement carried by the removable cover and separate from the set of power input terminals, wherein the power input coupling arrangement is adapted to be electrically interconnected with the power input terminals and selectively receives the input member of the flexible cord to supply power to the power transfer device through the coupling arrangement and the set of power input terminals.

11. The auxiliary power supply system of claim 10, wherein the power input coupling arrangement is adapted to be electrically interconnected with the power input terminals by means of a set of power input wires extending therebetween.

12. The auxiliary power supply system of claim 10, wherein the power input terminals are connected to the switches by a second set of wires.

13. The auxiliary power supply system of claim 10, wherein the cabinet includes a set of tabs spaced along an end wall thereof, the tabs having apertures formed therein.

14. The auxiliary power supply system of claim 13, wherein the cover includes a set of openings alignable with the apertures in the tabs.

15. The auxiliary power supply system of claim 14, wherein a set of fasteners is passed through the openings in the cover and is threadably engageable with the apertures in the tabs.

16. The auxiliary power supply system of claim 15, wherein one of the fasteners is used to secure the coupling arrangement to the cover.

17. A method for constructing a power transfer device for supplying power from a generator to the electrical system of a building, the method comprising the steps of:

providing a cabinet having a fixed position panel defining an opening providing access to a connection compartment within which a power input connection arrangement is located;

equipping the cabinet with a plurality of switches electrically connected to the power input connection arrangement, wherein the switches are adapted for connection to the building electrical system and are operable to control the supply of power from the power transfer device to the building electrical system;

providing a first removable cover member adapted for removable mounting to the cabinet, wherein the first cover member is incapable of power input and is configured to close the opening when mounted to the cabinet for selectively enclosing the power input connection arrangement;

providing a second removable cover member having a power input structure separate from the power input connection arrangement, wherein the second cover member is adapted for removable mounting to the cabinet and is configured to close the opening when mounted to the cabinet for selectively enclosing the power input connection arrangement; and selecting one of the first cover member and the second cover member and mounting the selected one of the cover members to the cabinet over the connection compartment;

wherein the step of mounting the second cover member includes electrically interconnecting the power input structure with the power input connection arrangement; and wherein, when the first cover member is mounted to the cabinet, a set of power input wires interconnected with the generator are supplied to the cabinet and are connected to the connection arrangement.

* * * * *

UNITED STATES PATENT AND TRADEMARK OFFICE
CERTIFICATE OF CORRECTION

PATENT NO.    : 6,293,821 B1                                             Page 1 of 1
DATED         : September 25, 2001
INVENTOR(S)   : David D. Flegel It is certified that error appears in the above-identified patent and that said Letters Patent is hereby corrected as shown below:

<u>Title page,</u>
Item [56], References Cited, please insert :

| -- | 3,277,251 | 10/1966 | Daly    | 3,284,591 | 11/1966 | Daly |
|    | 3,361,938 | 1/1968  | Watson  | 3,391,374 | 7/1968  | Schleicher |
|    | 3,523,166 | 8/1970  | Daly    | 3,559,148 | 1/1971  | Hafer |
|    | 3,636,237 | 1/1972  | Hafer   | 3,654,484 | 4/1972  | Jorgenson et al |
|    | 3,716,683 | 2/1973  | Hafer   | 3,723,942 | 3/1973  | Dennison |
|    | 3,731,256 | 5/1973  | Hafer   | 3,739,321 | 6/1973  | Murphy et al |
|    | 3,742,431 | 6/1973  | Kobyner | 3,781,765 | 12/1973 | Schleicher |
|    | 3,922,053 | 11/1975 | Hafer   | 4,067,529 | 1/1978  | Milcoy |
|    | 4,088,829 | 5/1978  | Milcoy  | 5,070,252 | 12/1991 | Castenschiold et al |
|    | 5,268,850 | 12/1993 | Skoglund |         |         |       |

GENTRAN Catalog, GT1094C, Reliance Time Controls, Inc.,
1820 Layard Avenue, Racine, WI 53404, undated --

Signed and Sealed this

First Day of October, 2002

*Attest:*

*Attesting Officer*

JAMES E. ROGAN
*Director of the United States Patent and Trademark Office*